(12) United States Patent
Jarrow et al.

(10) Patent No.: US 6,539,269 B1
(45) Date of Patent: Mar. 25, 2003

(54) SYSTEM AND METHOD FOR PERFORMANCE SUPPORT

(75) Inventors: Tamara L. Jarrow, Lawrence, KS (US); Gary D. Elsbernd, Topeka, KS (US)

(73) Assignee: Payless Shoesource, Inc., Topeka, KS (US)

( * ) Notice: Subject to any disclaimer, the term of this patent is extended or adjusted under 35 U.S.C. 154(b) by 0 days.

(21) Appl. No.: 09/565,939

(22) Filed: May 5, 2000

(51) Int. Cl.⁷ .............................................. G05B 15/00
(52) U.S. Cl. ............................ 700/83; 700/90; 434/107
(58) Field of Search ............................ 700/17, 83, 90; 434/107, 219, 322, 433; 702/182; 705/16; 706/16, 47

(56) References Cited

U.S. PATENT DOCUMENTS

| | | | | |
|---|---|---|---|---|
| 5,820,386 A | * | 10/1998 | Sheppard, II | 434/322 |
| 5,978,648 A | * | 11/1999 | George et al. | 434/362 |
| 6,039,575 A | * | 3/2000 | L'Allier et al. | 434/323 |
| 6,213,780 B1 | * | 4/2002 | Ho et al. | 434/219 |

* cited by examiner

Primary Examiner—Paul P. Gordon
(74) Attorney, Agent, or Firm—Lathrop & Gage L.C.

(57) ABSTRACT

The present invention is directed to a system for performance support configured to operate on at least one processor by a user. The system comprises content configured as granules of information in multi-media formats. The system further comprises a computer based learning module configured with performance-centered situated based instruction to generate a subset of the content having selected granules of information and at least one of the multi-media formats based upon a user selection. The system further comprises a user interface configured to generate the subset of content having the selected granules of information in the multi-media format for viewing by the user. Applications automate complex tasks by embedding business rules and procedures into the applications. Reference interventions are included that generate content, such as policies and procedures, in the form of references and cue cards.

1 Claim, 6 Drawing Sheets

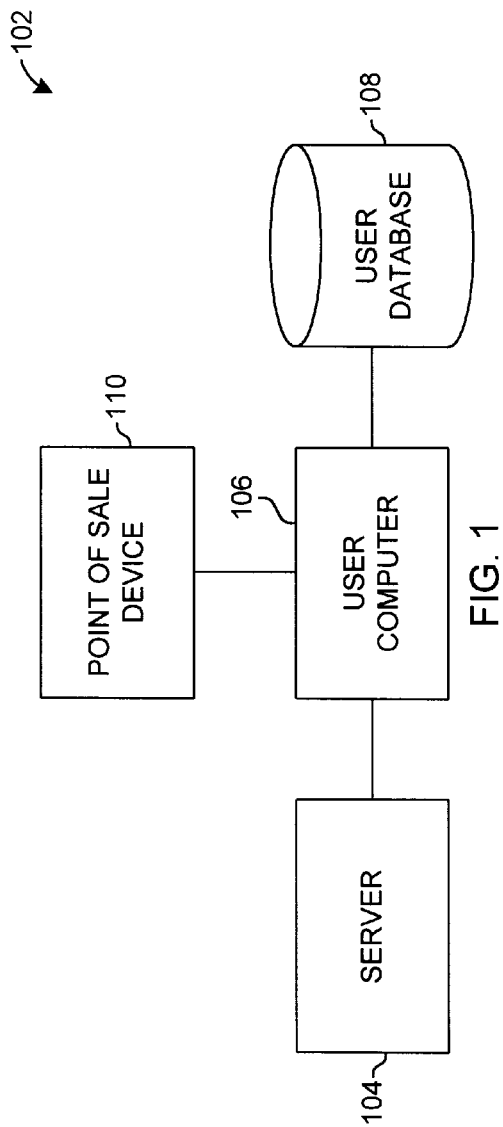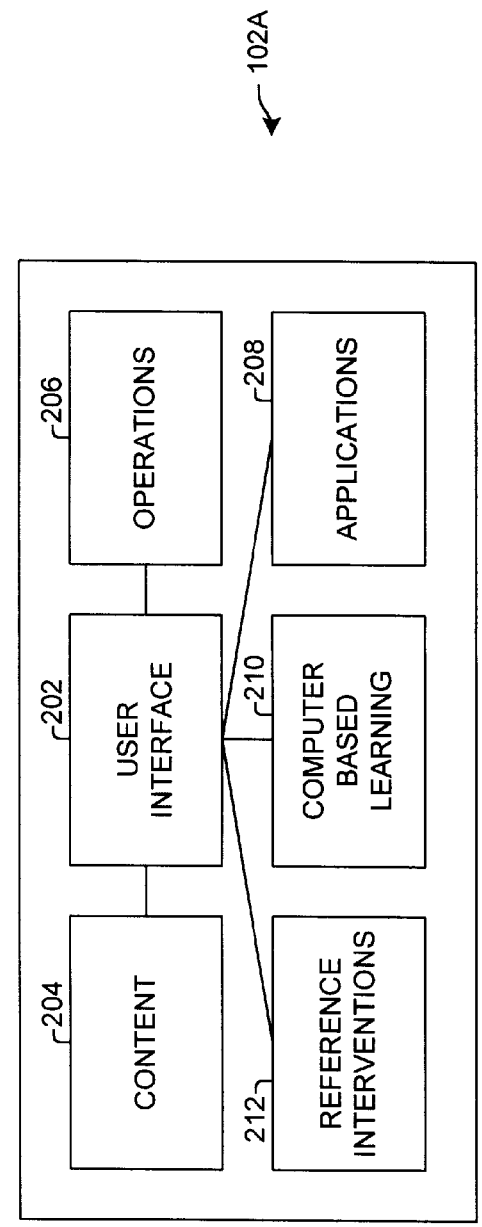

SYSTEM AND METHOD FOR PERFORMANCE SUPPORT

FIELD OF THE INVENTION

The present invention is related to the field of a virtual office for generating and operating business applications and operations and obtaining knowledge and training using a performance support system.

BACKGROUND OF THE INVENTION

Traditional training and support typically includes seminars, classes, documentation, and help desks. Many of these training and support methods are linear with a goal of teaching a person how to do a task from start to finish.

Today the work force has changed, and traditional training and support using linear methods is not as effective as it was in the past. Many factors have contributed to this changing workforce and the changing view of employees as trainees.

Many trainees are transient. The turnover rate of employees typically is high, and ongoing adaptation and learning is required. Therefore, a great amount of money currently is being spent for training and support since new employees constantly are being hired to replace employees that are no longer with a company.

In addition, trainees can be existing employees that require further training. Therefore, training also must be geared to continuing education and support of systems and operations. Training and support for these existing employees should cover situations that arise on-the-job requiring real time answers as well as situations that can be answered other than in real time, including training that can occur at the option of the trainee when desired.

Many trainees are busy with workloads as work becomes increasingly complex. The trainees desire to know why they are to learn something before they will take the time to learn it. They want to see the value in the training.

Many trainees are used to activity in the computer age. They are computer literate and expect that they can obtain information, including training and support information, by using a computer. They expect immediate gratification of answers to questions or issues.

Compounding this expectation of immediate gratification is an inherent self-reliance for learning, solving problems, and determining answers. These trainees have an ability to adapt quickly to changing information and to changing methods of operation. They desire the ability to control the learning process and to manage their own time during the learning process. Thus, the trainees desire to control navigation through training systems in a variety a ways.

Moreover, people learn at different rates. Expecting all trainees to have the same initial knowledge, the same rate of learning, and the same retention is unrealistic. Also, people learn in different ways. While one trainee may learn well from traditional methods, others learn better from self teaching and from other methods. Thus, a variety of methods and information sources that can be accessed at different rates and times are needed to provide more efficient and more effective training. This would allow a trainee to determine how the trainee can best learn the information.

Learning is a continual process, not an event. Therefore, the training and support should be geared toward constant inquiries and re-inquiries about pieces of information in addition to information about whole systems and whole processes.

Because the factors for efficient and effective training are so varied, no one training method is sufficient. A refocus to support performance of the employee/trainee for required tasks is desired instead of focussing on specific processes or training methods.

Also, with the advent of new fast paced environments at retail stores, it has become increasingly necessary to increase the efficiency of existing employees and to quickly train new employees efficiently so that they are effective at their jobs. Thus, there no longer is an opportunity for new employees to spend long periods of time studying operations of businesses, how to perform specific tasks and functions, or to learn new skills to advance as valued employees. The new primary objective is for an employee to become as productive as possible, as soon as possible, and to remain a productive employee.

Existing systems are not sufficient to meet the requirements of quick, effective, and efficient learning and training for new employees and continuing learning and training of current employees in an environment that would allow them to learn at their own pace. Thus, an improved system is needed that operates as a virtual office or virtual store. Such a virtual store would enable an employee to be a user on a computer based system to learn policies, procedures, and tasks necessary to operate effectively and efficiently as an employee. Additionally, such a virtual store would enable experienced employees to operate as users on the system for continuing training and learning of knowledge of policies, procedures, and tasks to continue to operate effectively and efficiently and to increase that efficiency.

Thus, a system is needed that focuses training on performance based support that provides information at the moment of need and in the best mechanism for the person attempting to learn and retain the information. A system is needed that focuses training on performance conditions, requirements, and end results and that provides information that can be accessed by, and presented to, a broad spectrum of personnel for multi-media learning. A system is needed to increase performance efficiency and effectiveness while reducing costs.

SUMMARY OF THE INVENTION

The present invention is directed to a system for performance support configured to operate on at least one processor by a user. The system comprises content configured as granules of information in multi-media formats. The system further comprises a computer based learning module configured with performance-centered situated based instruction to generate a subset of the content having selected granules of information and at least one of the multi-media formats based upon a user selection. The system further comprises a user interface configured to generate the subset of content having the selected granules of information in the multi-media format for viewing by the user.

BRIEF DESCRIPTION OF THE DRAWINGS

FIG. 1 is a block diagram of a performance system architecture in accordance with an embodiment of the present invention.

FIG. 2 is a block diagram of a performance system in accordance with an embodiment of the present invention.

DETAILED DESCRIPTION

Figure 3:
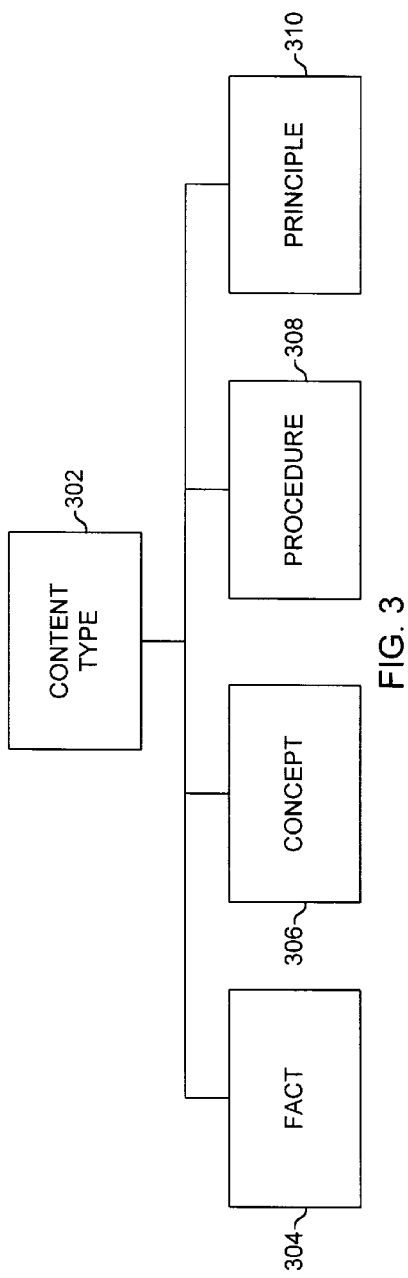
FIG. 3 is a block diagram of content types for a performance system in accordance with an embodiment of the present invention.

The performance system of the present invention provides a computer-based performance support system that has an environment in which the focus is on tasks to be performed, instead of on the tools used to accomplish those tasks. The present invention is an integrated system having applications, training, and references in a multi-media and multi-generational format that generates multiple ways of learning using multiple sensory output methods.

The performance system is available at the point of need. The user can request information at the specific moment of performance so that learning becomes part of the task being accomplished. Thus, in an example where a user is an employee of a retail store, is asked by a customer for a product, and must perform a complex process to determine if and where the product is available, the user can use the system to determine how to complete the process, to locate the product for the customer, and to sell the product to the customer. This directly results in increased profits as potential lost sales are converted to sales.

In this way, training and support become part of the work environment and not an event, making the information more readily learned and remembered. This makes the learning process more efficient and effective for that individual.

Because the performance system is performance-based, the system is directed from a user's point of view, not an instructor's point of view. The computer-based learning allows users to control when they learn, how they learn, and in what order they learn. This control allows a user to access more in-depth training when and where needed, and allows the user to remain at a more high level knowledge base when in-depth training is not needed. This increases the effectiveness and efficiency of the learning process for each individual.

Because the invention is computer-based, as information is updated and completed, it is distributed immediately electronically. This electronic distribution reduces the amount of paper that must be printed and distributed, reduces storage allocation, and reduces the costs associated with each. In addition, continuous, on-the-job, just-in-time learning tools are provided as desired. As used herein, "just-in-time" means providing learning tools or training when and where a user wants it.

The performance system combines knowledge of systems and processes performed during the course of a business with knowledge of the business. This includes internal information, such as employee information, policies, processes, and financial data, and external information, such as industry data, market data, and customer data.

Because information is easily and readily available, first time users of the system are enabled to perform tasks proficiently with little or no other training or help from others. The same system also enables more experienced users to deal proficiently with new situations with which they have no familiarity.

The performance system and tasks to be performed using the performance system are designed to be intuitive to provide intrinsic knowledge of the business and systems used in the business. Integrated computer-based performance support that recognizes potential trouble spots and recommends courses of action engenders users with extrinsic knowledge that may not be readily apparent to the user. This use and presentation of intrinsic knowledge and extrinsic knowledge constantly provides training and support to a user and helps the user to prevent potential problems that may occur while performing tasks.

The performance system uses a performance-centered approach for computer based learning (CBL). This performance-centered CBL generates intrinsically based information and content to a user so that learning occurs not only in viewing content, but also in viewing total performance tasks, performing tasks, and reviewing task based content in a naturally occurring environment generated from the computer. The CBL uses the approach that users learn best when they are placed in realistic situations where there is an immediate or naturally occurring reward for a desired behavior. Thus, the CBL provides real life scenarios from which a user can practice required skills in a safe computer based environment and to interactively generate content and information to a user based upon requests of a user, responses of a user to questions or situations, or actions or tasks performed by a user during a learning process or a business operation. This performance-centered CBL is an advance over traditional computer based training that was based on a behavioristic approach and that separated learned behaviors from the context of the job. This traditional computer based training broke tasks into finite elements, teaching each element and attempting to recombine the elements into a representation of a task or job. Whereas, with the performance-centered CBL, behaviors and content are learned within the context of a job or task. This allows a user to more easily learn and retain the content and information.

The performance-centered CBL uses "real life" scenarios that reflect situations encountered on a daily basis. Problems and required tasks are generated to the users for solving and performance, and users can seek the information and guidance necessary to appropriately respond to a situation for the problem or task while remaining in a safe CBL training environment. Because real life scenarios are used, the learning by the user from the CBL is more meaningful and more interesting. Because users are more interested and because the content and information reflects a virtual office, the users learn faster and retain the learned content for a longer period of time.

In addition, the performance-centered CBL uses a variety of scenarios that have multiple paths. Thus, users have an opportunity to develop their own knowledge structures in the way that allows them to best learn and retain the knowledge. These structures and the performance-based CBL that uses the real life scenarios are referred to herein as situation based instruction (SBI).

The SBI is beneficial for both new users learning new information and experienced users attempting to learn new tasks or information or to relearn other tasks or information. Because the SBI generates content in granules that focus on a particular step of a task or a particular piece of content, information is more readily learned and retained, and various paces of learning the information can be used. The SBI uses one or more of text, graphical information, animated processes, audio, and video to generate content to a user in the form that is selected by the user. This enables the user to select the content in the way that can be most effectively and efficiently learned by the user.

FIG. 1 depicts an exemplary embodiment of a performance system of the present invention. The performance system 102 operates as a virtual office enabling a user to perform computer based learning and training to efficiently and effectively learn tasks and procedures, to review policies and procedures, and to perform business and environmental operations, tasks, and procedures associated with daily business. The performance system of 102 of FIG. 1 comprises a server 104, a user computer 106, a user database 108, and a point of sale (POS) device 110.

The server 104 contains content and applications that can be transmitted to the user computer 106. The server 104 is configured to periodically collect information and communications from the user computer 106. For example, the server 104 can collect transaction information, user information, and other database information and can download new or updated content, applications, or communications to the user computer 106. The server 104 is the main repository for information at a central location.

The server 104 is connected to the user computer 106 via a connection. The connection can be a network connection, an intranet or internet (IP) connection, or another type of connection that allows communications to be transmitted between the server 104 and the user computer 106. The server 104 can communicate with the user computer 106 using "push" technology, "pull" technology, polling, or other communication mechanisms.

With push technology, the server 104 initiates a connection to the user computer 106 and pushes content, applications, and other information and software to the user computer, in addition to collecting information. With pull technology, the user computer 106 connects to the server 104 and pulls content, applications, and other information and software from the server to the user computer. With polling, the server 104 connects to the user computer 106 to determine if information should be retrieved from the user computer and/or to retrieve information from the user computer. This information may be inventory information, sales information, user information, scheduling information, or any other information resident on the user computer 106. The server 104 and the user computer 106 may use one or more of these technologies in various embodiments.

The server 104 is optional in some embodiments, and the performance system 102 does not require the server to operate. However, the optional server 104 can be used when multiple user computers in multiple locations are used. In some embodiments, the server 104 is a web based server configured to generate web based pages to the user computer 106.

The user computer 106 is any computer processor that enables entry of information by a user, generates information that can be displayed to a user, and operates applications and programming for the performance system 102. The user computer may have input devices, such as a keyboard and a mouse, an output device, such as a monitor and/or a printer, a hard disc drive, and an optional compact disk read only memory (CD ROM). The user computer 106 may have a modem, and communications between the user computer and the server 104 can be provided over a dial-up communication line, such as a digital or analog communication line.

The user computer 106 communicates with the server 104 and operates software and applications for the performance system 102. Preferably, the user computer 106 has a browser configured to access web based pages. In some embodiments, the user computer 106 uses the browser to connect to the server 104 over a IP connection. In other embodiments, the user computer 106 uses the browser to access web based pages of applications and content that reside on the user computer.

The user database 108 stores information, such as content, applications, user information, inventory information, and/or other information, associated with the performance system 102. The user database 108 may be within or external to the user computer 106.

The POS device 110 is any device used to collect or output sales information. The POS device 110 may communicate with the user computer 106 for information, including inventory information and pricing. The POS device 110 may include a credit card authorization device and a check authorization device.

FIG. 2 depicts an exemplary embodiment of a performance system 102A of the present invention. The performance system 102A operates as a virtual office, enabling the user to enter and view information related to operations of the office and to access and operate computer based learning directed toward office procedures and tasks, policies, operations, and other events. The performance system 102A comprises a user interface 202, content 204, operations 206, applications 208, computer based learning (CBL) 210, and reference interventions 212.

The user interface 202 generates information to a user and enables a user to enter information for processing by the performance system 102A. The user interface 202 is browser based. Thus, the user interface 202 uses web enabled pages that are generated for providing information to a user or enabling a user to enter information. Preferably, the user interface 202 generates pages that use the hypertext mark up language (HTML) or the dynamic HTML (DHTML) standards incorporating JAVA programming. The web enabled technologies describe how a page of information is to be formatted for display to the user. Web enabled technologies are examples of "pull" technologies.

The user interface 202 generates screens that have navigation components, such as menus, hot spots, and/or hyperlinks to other screens. When a navigation component is selected, the user interface 202 generates a new screen with additional information, modified information, or new information.

The user interface 202 is used to access content 204, operations 206, applications 208, the CBL 210, and the reference interventions 212. Thus, information from these modules is generated to the user via the user interface 202, or information to be used by these modules is received via the user interface.

When HTML and DHTML based screens are used, maintenance and updates for the screens can be more efficiently produced. Each screen is treated and stored as a separate element, rather than as part of a large application. In addition, if a portion of the screen must be modified due to changes in content or navigation, then only the HTML or DHTML file representing that screen need be modified, not the entire set of screens. Moreover, the size of HTML files or DHTML files typically are small. Thus, updated screens stored in HTML files or DHTML files can be more quickly transmitted.

Content 204 includes user information, inventory information, operations information, information used in conjunction with the CBL 210, and referential information used in conjunction with the reference intervention 212.

Content 204 is provided in a variety of forms and formats. For example, content 204 can be provided as text, graphical information, animated processes, audio, video, and still pictures or photographs.

Content 204 is divided into small, discreet, individually managed elements of content referred to herein as granules. A granule is the information within a single content type about a topic, task, process, policy, or issue that can be understood independently in the context of a decision making process or a job or learning performance. Granules are defined in terms of tasks or procedures rather than tools used to accomplish the task or procedure. For example, separate pieces of content with identical subject matter but different attributes are considered as separate granules. Moreover, if a step in a process is done as a discreet activity, the step is a separate granule. Also, if different performers perform different steps in a process, the steps are separate granules. Combinations of associated granules can be identified as chunks.

The operations 206 control business operations and environmental operations for the equipment and software of the performance system 102A. The environmental operations include, for example, computer operating system operations, management of connectivity for connections, printing operations, and access by users to the performance system 102A. Business operations include, for example, inventory management operations such as processing shipment information and processing inventory information, employee management operations such as generating scheduling, planning, and tasks, content management such as pushing, pulling, polling, or storing information, and infrastructure management such as security management or utility management. It will be appreciated that one or more of the preceding may be excluded from the operations 206.

The applications 208 are software programs that carry out a task or procedure. The applications 208 automate complex tasks by embedding business rules and procedures into the applications and by providing access to, and interpretation of, dynamic content. An example of the applications 208 is a lot locator application that enables a user to locate inventory within a distribution area based upon an identification number, such as a lot number. Another example of the applications 208 is a browser application.

The CBL 210 generates training and instructional content to enable a user to learn about business operations and environmental operations. Because the CBL 210 uses content that is organized in a granular manner, the content can be accessed in a variety of ways, depending on the user's specific needs. Thus, a user can access content for learning at the user's pace and in a form most usable by the user for effective and efficient learning.

The CBL 210 uses performance-centered situated based instruction (SBI) to increase the user's ability to learn and retain information. The SBI is a structure providing content within the context of a task or job in a variety multimedia formats, such as text, graphics, animated processes, audio, and video, with the content organized in granules that can be selected by the user for multiple paths and in the multiple forms. The SBI enables a user to determine the best way to learn and retain information at a pace that is most effective and efficient for that user. The SBI is an advance over prior computer based training systems that separated learned behaviors from the context of a task or job and broke content and tasks into finite elements, taught each element, and attempted to recombine the elements into a representation of the task or job. These prior computer based training systems were not effective and efficient.

Text, graphics, animated processes, audio, visuals, and video portray simulated scenarios, the relationships to real scenarios, and user interactions. During use, clicking a mouse or otherwise making a selection at designated points during a training session, for example on a screen of the user interface, makes navigational choices and situational responses. Text is generated that can be read by a user. Graphics are generated to emulate environments of possible realistic situations. Audio is generated for narration of content and situations. Information displays are generated so that features and benefits of products, tasks, and other content can be viewed in a concise manner and selected for expanded explanations, descriptions, or further content. Animated processes and animated displays are generated to visually demonstrate the flow of processes, the operation of systems and processes, and dimensional characteristics and location of inventory in the virtual store. Video is generated for demonstrating interpersonal relations between a user and another individual and for setting the context of a problem in a realistic fashion. Video enables a user to accept multiple sensory information, such as body language, facial expressions, and intonations, in addition to seeing proper execution of tasks and procedures and final products.

By providing the content in these different forms, the CBL 210 enables a user to obtain information through more than one sensory channel. This is referred to herein as channel redundancy.

Simulated scenarios and role playing provide additional learning opportunities using the CBL 210. Simulated scenarios are generated from the CBL 210 to present content in the context of tasks or jobs by identifying meaningful problems to solve. The simulated scenarios, when executed, generate feedback to the user based upon decisions selected by the user. Other information that applies to a specific scenario automatically is generated as feedback to the user. This feedback is generated at decision points made by the user and learning break points selected by the CBL 210, referred to collectively herein as "decision break points". Because the scenarios simulate real life situations, the user is more aptly able to handle the real life scenarios because the user, in the user's mind, has already performed the task or completed the interaction.

Role playing models are generated by the CBL 210 as actions necessary for a task that can be mimicked by the user or content that can be spoken by the user for a response to a situation. Role playing increases a user's retention of information over more passive approaches.

The CBL 210 may include a comprehension check. With the comprehension check, a scenario is generated, a user responds to the scenario, and the user checks their comprehension level for relevant content. Responses are judged by the CBL 210 to provide feedback about those responses, including congratulatory or corrective feedback. The comprehension check is used for self-assessment by the user.

The CBL 210 also may include a certification module. The certification module tracks performance and mastery of content by the user and records the performance level of that user. Certification by a certification module can be used to ensure consistency of content knowledge levels and task management by users.

Reference interventions 212 generate information based material, in contrast to knowledge that is intended to be learned or knowledge that is imbedded into an application, i.e. such as with the CBL 210. Reference interventions 212 preferably comprise references and cue cards. References provide content designed for on-screen viewing, such as policies, procedures, and other online resources. With references, the reference interventions 212 generate searches and links for finding, reading, and printing desired content. Cue cards also generate information based material. However, cue cards generate content in the form of a viewable and printable "page" with enough information and context to facilitate performance.

FIG. 3 depicts an exemplary embodiment of parts of content that may be used in the performance system 102A. All content has a content type 302. Examples of content type 302 that may be included in the performance system 102A area fact 304, aconcept 306, a procedure, 308, and a principle 310.

A fact 304 is a specific piece of information that is the foundation for learning. Facts may include names, definitions, dates, labels, locations, and numerical values. Examples of facts include muscles, pool points, a phone number, shipment processing definitions, and inventory identifications.

A concept 306 is a group of items that shares features, attributes, or characteristics. A concept 306 can be considered a class of objects, events, or other items that can be called by a common name. A concept 306 can be simple or complex and concrete or abstract. A concept 306 may include nouns, modified nouns, or a juxtaposition of relevant nouns or modified nouns. Examples of concepts include food, a travel plan, a mammal, a traffic signal, a motorized vehicle, a pump, a monthly invoice balance report, emergency and non-emergency procedures, and shipment processing.

A procedure 308 has a set or a series of defined steps that, together, lead to a specific outcome or task completion. A procedure 308 may apply to a single situation or to a general series of steps that can be applied in multiple situations, such as troubleshooting situations. A procedure 308 may or may not include imbedded decision points. Examples of procedures include how to answer a telephone, how to process shipments, how to develop a work plan, and how to prepare an inventory audit.

A principle 310 is a proposition or statement that describes some occurrence or a rule that applies in a specific circumstance. A principle 310 is a cause and effect relationship that provides explanations of occurrences in different situations. A principle 310 also includes formulas or other guidelines that may be applied in certain situations. A principle 310 typically is employed in problem solving situations, troubleshooting scenarios, and synthesis exercises. Principles typically identify a subject, a verb, and an object showing a cause and effect relationship in addition to participles describing activities with underlying guidelines. Examples of principles include keeping good employees, tracking new customers, sales/profits, hide errors, $E=MC^2$, product knowledge facilitates sales, and placing inventory on display.

Figure 4:
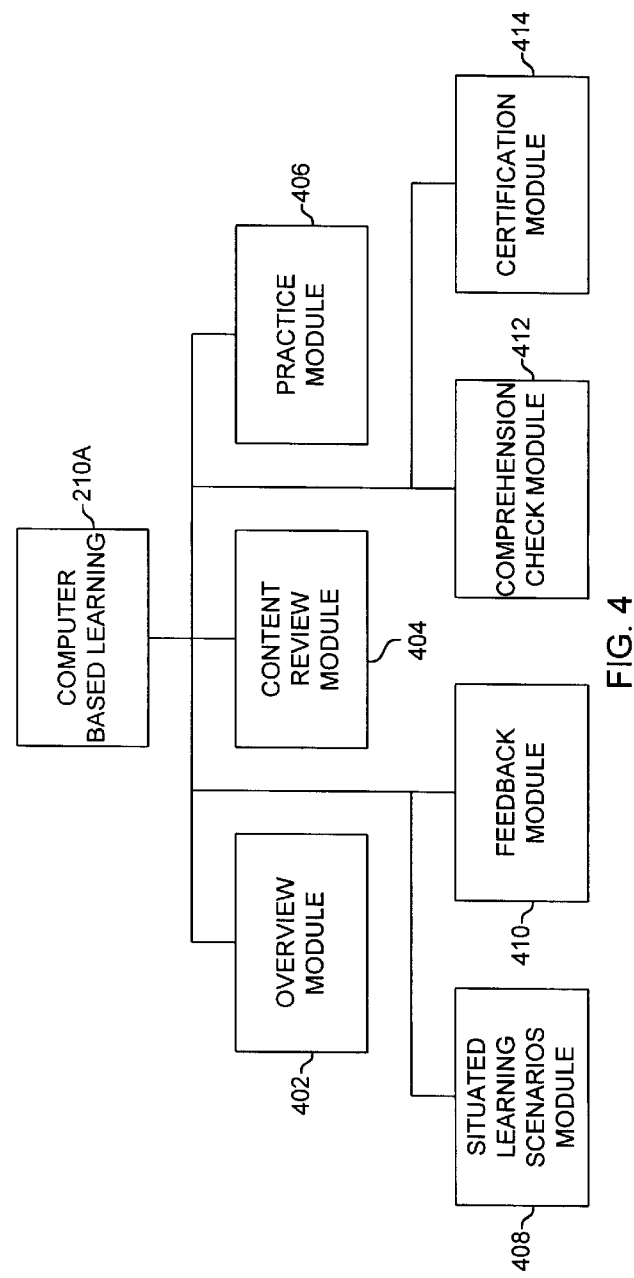
FIG. 4 is a block diagram of computer based learning for a performance system in accordance with an embodiment of the present invention.

FIG. 4 depicts an exemplary embodiment of a CBL 210A. The CBL 210A of FIG. 4 comprises an overview module 402, a content review module 404, a practice module 406, a situated learning scenario module 408, and a feedback module 410. Optionally, the CBL 210A may comprise a comprehension check module 412 and a certification module 414.

The overview module 402 generates an overview of a topic in an easy to read format. Topics may include tasks and activities that must be performed in the course of the user's job, techniques, and descriptions and identifications of inventory and systems. The overview module 402 may include hyperlinks to additional information.

The content review module 404 generates reference material that guides a user in acquiring knowledge for a task, technique, inventory, or system. The content review module 404 also generates content such as policies and procedures. The content review module 404 may, for example, generate lists of critical information for inventory, such as the brand, the manufacturer, or the storage location.

The practice module 406 generates sequenced and unsequenced practice simulations. The sequenced practice includes guided practice having a series of questions or situations in which a specific question or situation is generated based upon a response from a prior question or situation. Unsequenced practice is unguided practice in which questions or situations are presented in a random or singular manner and not based upon prior responses, questions, or situations. The practice module 406 generates practice sessions that require a user to apply information learned that can be applied to real life situations. The practice sessions are integrated with content presented to ensure that comprehension and retention of content is high. An example of a practice session generated from the practice module 406 includes identifying features and benefits of a piece of inventory. Another example of a practice session generated from the practice module 406 includes generating a practice question asking what a user should do next when a customer has agreed to buy a piece of inventory. Additional practice questions are generated based upon either the response of the user or a pre-selected sequence of questions. Sequences can be tailored for individual users.

The situated learning scenario module 408 generates a series of questions that are to be answered based upon a video, such as determining the type of interaction that should occur between a customer and a user based upon a current situation. Additional scenarios, including scenarios presented with video, audio, or text, can be presented either based upon responses from the user or a pre-selected sequence. Sequences can be tailored for individual users. The scenarios generated by the situated learning scenario module 408 provide realistic scenario based practice using drawings, still photos, video, audio, animation, or a combination of media.

The feedback module 410 generates feedback to a user based upon responses or entries made to a practice session generated from the practice module 406 or from scenarios generated from the situated learning scenario module 408. The feedback generated from the feedback module 410 is tailored for each individual response based upon the question, situation, or scenario presented to the user and based upon prior questions, situations, or scenarios presented to the user and the user's prior responses. The feedback provides positive reinforcement for correct choices or responses and corrections for incorrect choices or responses. The feedback also addresses common misconceptions about questions, situations, and scenarios.

The comprehension check module 412 tracks responses of users during practice sessions and scenarios and determines the comprehension level of the user based upon those responses. The user's responses are judged to provide feedback about the responses, such as corrective feedback or congratulatory feedback. The comprehension check module 412 can use multiple choice questions, audio, video, and/or "click and drag" features to elicit a user's response. The proficiency of the user is tracked in order to document the user's knowledge level. The proficiency level can be reflected in any appropriate manner, including a response gauge that depicts the user's progress through a session.

The certification module 414 tracks performance of a user of computer based tasks and transactions in addition to demonstrated comprehension levels of content. The certification module 414 tracks errors, successful task completions, and help screens that have been accessed. The performance level is assessed for a minimum level of knowledge and a specific degree of knowledge. The certification module 414 can provide standard and systematic evaluation of performance of all users and identify areas in which a user should be reevaluated. The certification module 414 can be configured to generate randomized quizzes with random sequences and question orders to determine a user's knowledge level.

Figure 5:
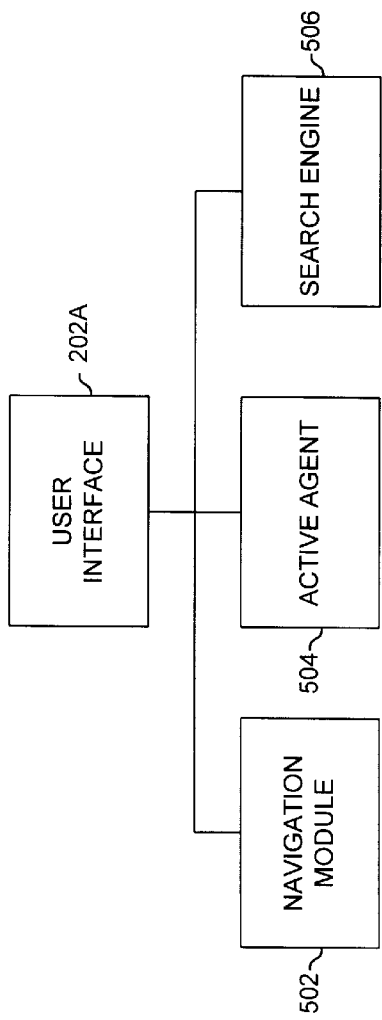
FIG. 5 is a block diagram of user interface functions for a performance system in accordance with an embodiment of the present invention.

FIG. 5 depicts an exemplary embodiment of functional modules for a user interface 202A. The functional modules of FIG. 5 include a navigation module 502, an active agent 504, and a search engine 506.

The navigation module 502 enables a user to move from one functional area of the performance system 102A to another functional area. The navigation module 502 is designed to be shallow so that a user does not have to navigate through more than three levels of information or functional areas to reach a desired screen. The navigation components for the navigation module 502 are presented on each screen generated by the user interface 202A.

Navigation components include icons generated on the screen, hot spots generated on the screen, and links generated on the screen. In addition, a back button is used to return to a previous screen or location.

An icon is a picture or symbol representing an object, task, command, or choice. The icon can be selected to navigate to another functional area, to navigate to another screen, to access content, or to open an application. A hot spot is a location on a screen that contains an embedded hyperlink.

A hot spot typically is a graphically defined area in an image that contains a hyperlink. A hot spot can have an associated mouse over. This means that when a cursor that is being moved by a mouse or other device is placed on or near a hot spot, text or a graphic is displayed that visually highlights the hot spot.

A hyperlink is a link from one part of a page to another page. A hyperlink can be imbedded as a word or a term on the screen. When a hyperlink is selected, the user interface 202A generates another screen, a portion of a screen, or new information on a screen.

The icons and hyperlinks are generated within menus and/or tabs. For example, a menu can be generated containing hyperlinks and menu options. In one example, if a menu option is selected, a subset of menu options is presented for selection by the user. As stated above, preferably only three levels of menus and submenus will be presented to a user.

The active agent 504 is an animated help agent. The active agent 504 is available throughout the performance system 102A. When selected, the active agent 504 provides a list of context sensitive help topics. These topics may include screens or functional areas of the user interface 202A, policy and procedure entries, cue cards, computer based learning, or reference entries. If the topic for which the user wants help is not on the initial list, the user can ask to see more topics or can use the search engine 506 to locate content.

In addition, the active agent 504 can generate a guided tour of the main features of the main menu or main screen. The tour utilizes the active agent 504 as a guide. During the tour, the active agent 504 moves to strategic locations on the screen and provides the user with a descriptive narration, both aurally and visually, of the features of the screen elements at that location, including navigation components such as icons, hot spots, hyperlinks, and menu items. Screen navigation components can be configured to highlight or flash while the descriptive narration for that location is being generated by the active agent 504.

Reference links list the most useful reference material related to the topic of the page being viewed when the active agent 504 is activated. Application links provide logic points for applications that are related to the topic of the page being viewed by the user when the active agent 504 is activated.

The search engine 506 enables a user to enter a search criteria in a search box and to initiate a search. The search engine 506 then will search all content to determine if a match exists for the search criteria. The search results are generated to a search result dialog box that displays matches or the closest matches to the search criteria. An icon indicates the type of resource identified as the match, and a descriptive title indicates the content area for each match. Preferably, a user can enter a natural language query as the search criteria. Alternately, a key word search or a boolean search can be used as a search criteria.

Figure 6:
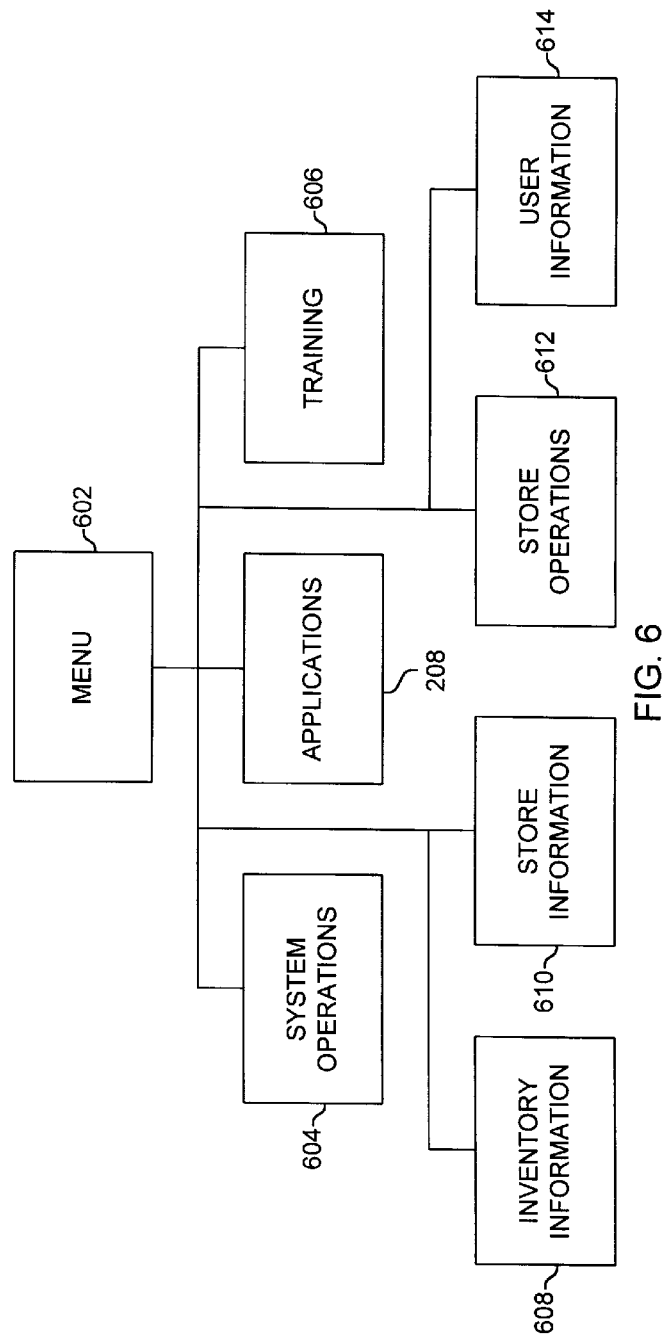
FIG. 6 is a block diagram of a menu for use in a performance system in accordance with an embodiment of the present invention.

FIG. 6 depicts an exemplary embodiment of a menu that can be used in conjunction with a user interface 202A. The menu 602 of FIG. 6 comprises system operations 604, applications 208, training 606, inventory information 608, store information 610, store operation 612, and user information 614. The applications 208 are the same applications as described above. The menu items can be depicted as icons, hot spots, or text based hyperlinks.

The system operations 604 enable a user to perform operations necessary to operate the applications 208, retrieve and view content, perform any CBL operations, and operate the user computer 106 (see FIG. 1). The system operations 604 enable a user to access the user computer 106 and to generate information.

The training module 606 includes one or more of a CBL and reference interventions. The training module 606 enables a user to access and perform all computer based learning operations and to access content for learning.

The inventory information 608 is a subset of content that identifies all inventory. The inventory information 608 may include a description of each piece of inventory, a lot number associated with each piece of inventory, pricing, quantity, storage location, shipment information for inventory to be delivered, identification of inventory in regional areas or other distribution areas, and other information necessary for identifying inventory.

The store information 610 is a subset of content directed toward store operations as a whole. This store information 610 may include store policies and procedures, human resources information, scheduling for tasks or jobs, safety information, and employee scheduling information.

Store operations 612 include software modules necessary to operate a store. Store operations 612 may include sales generating and tracking modules, employee planning and scheduling modules, and communication systems that enable employees to communicate with one another and to other computers or servers.

The user information 614 includes information identifying users and information related to a user operating applications 208 or training 606. The user information 614 can be user specific.

Figure 7:
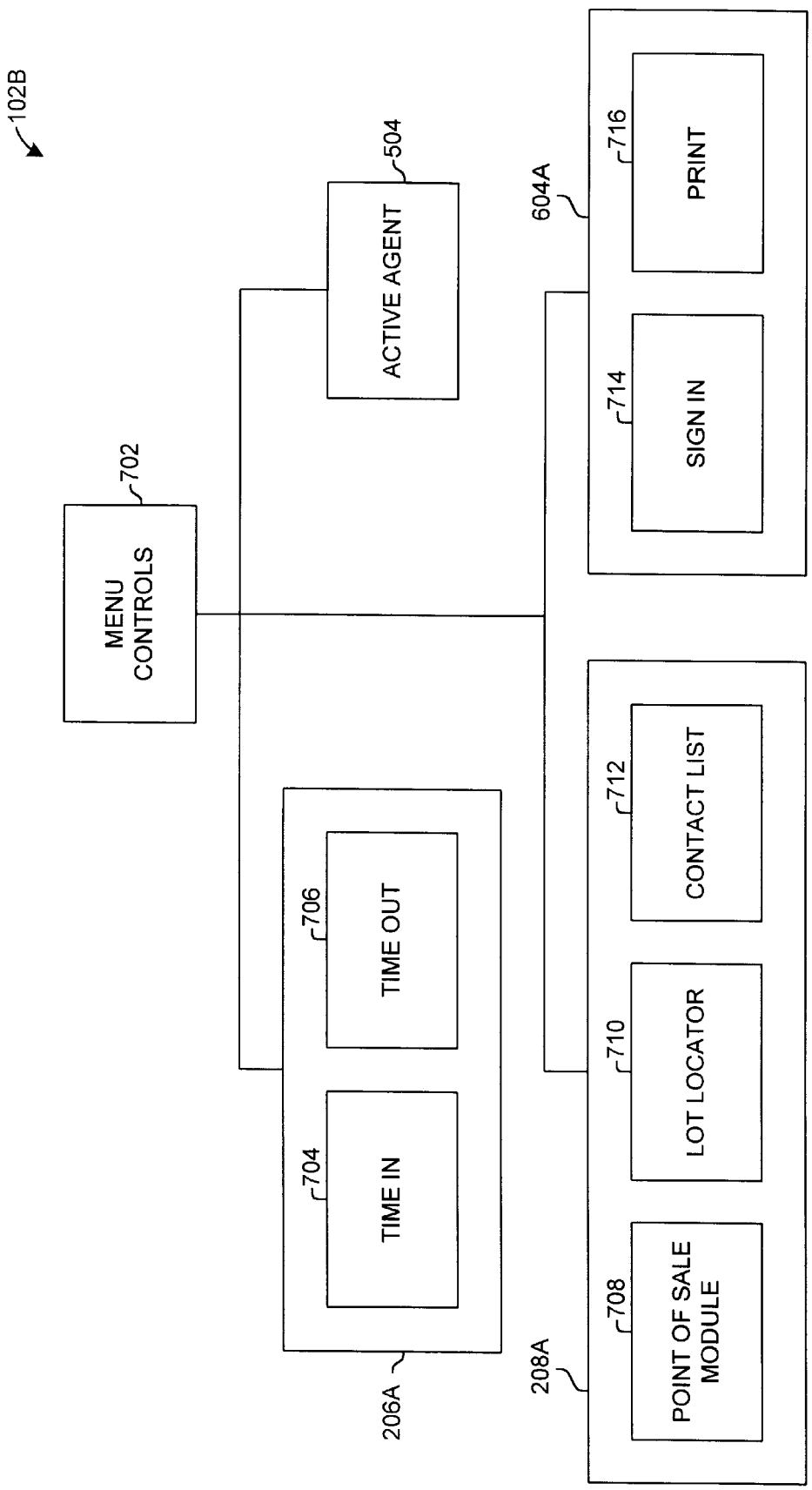
FIG. 7 is a block diagram of menu controls for a menu in a performance system in accordance with an embodiment of the present invention.
Figure 8:
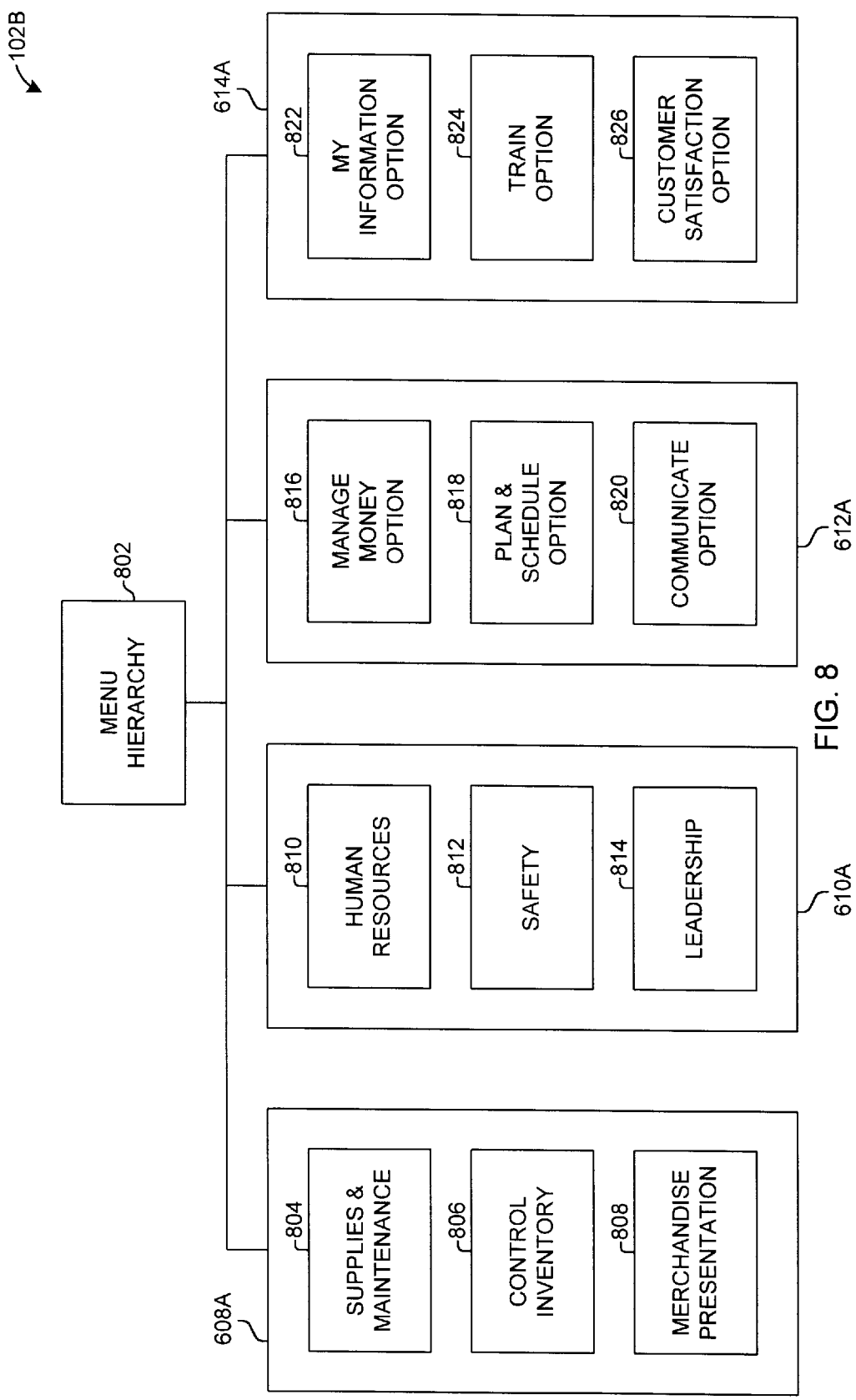
FIG. 8 is a block diagram of a menu hierarchy for a menu in a performance system in accordance with an embodiment of the present invention.

FIGS. 7 and 8 depict exemplary embodiments of menu controls and a menu hierarchy for a performance system 102B implemented for a virtual store. The menu controls 702 are used to open applications and system operations. The menu hierarchy 802 is used to access content, store operations, store information, training, and user information. It will be appreciated that other menu options, other menu controls, and other menu hierarchy options may be used. The active agent 504 is the active agent described above.

The menu controls 702 of FIG. 7 include operations 206A, applications 208A, an active agent 504, and system operations 604A. The operations 206A include a time in 704 and a time out 706. The time in 704 is used to record working hours. The time out 706 is used to stop recording working hours.

The applications 208A includes a point of sale module 708, a lot locator 710, and a contact list 712. The point of sale module enables a user to switch between point of sale operations and the other operations of the performance system 102B. The point of sale operations enable the user to use the point of sale device 110 and/or to operate the point of sale device from the user computer 106 (See FIG. 1). Alternately, the point of sale device is software and hardware that are resident within the user computer 106, and the point of sale module 708 enables the user to operate that point of sale device.

The lot locator 710 enables the user to locate a piece of inventory according to an identification number, such as a lot identification number. The contact list 712 is a list of addresses and/or phone numbers of other associated stores, storage locations, or personnel associated with the store.

The system operations 604A include a sign in module 714 and a print module 716. The sign in module 714 enables a user to access and enter the performance system 102B via the user computer 106. The print module 716 enables a user to print content or other information.

The menu hierarchy 802 generates menus and submenus that enable a user to navigate to functional areas of the performance system 102B. The menu hierarchy 102 comprises inventory information 608A, store information 610A, store operations 612A, and user information 614A.

The inventory information 608A comprises supplies and maintenance, control inventory 806, and merchandise presentation 808. The supplies and maintenance 804 enables a user to navigate to a functional area with screens that display supply orders, purchase orders, store information, and system administration information. The control inventory 806 enables a user to navigate to a functional area that depicts shipments of inventory, transfers of inventory, and damages to inventory. The merchandise presentation 808 enables a user to navigate to a functional area that identifies promotions for inventory, rack plans and other location identifications for inventory, and information related to displays of inventory.

The store information 610A comprises human resources 810, safety 812, and leadership 814. The human resources 810 enable a user to navigate to screens depicting personnel information and human resource information. The safety 812 enables a user to navigate to screens depicting emergency procedures, and injury guidelines and protocols. The leadership 814 enables a user to navigate to screens depicting leadership guidelines and suggestions for leadership activities and actions.

The store operations 612A comprises a manage money option 816, a plan and schedule option 818, and a communicate option 820. The manage money option 816 enables a user to navigate to a functional area with screens that depict store opening, store closing, currency management information and functions, and point of sale information and operations. The plan and schedule option 818 enables a user to navigate to a functional area with screens that depict store schedules, to do lists, and calendars. The communicate option 820 enables a user to send and view e-mail and to view bulletin boards.

The user information 614A comprises a my information option 822, a train option 824, and a customer satisfaction option 826. The my information option 822 enables a user to navigate to a functional area with screens that depict a particular user's to do list, schedule, and personal information. The train option 824 enables a user to navigate to a functional area from which the computer based learning can be launched or from which reference interventions can be launched. The customer satisfaction option 826 enables a user to navigate to functional areas that display policies and procedures geared towards satisfying customers at the store, in addition to links to practice areas that enable users to launch practice sessions and scenarios for customer satisfaction training.

Figure 9:
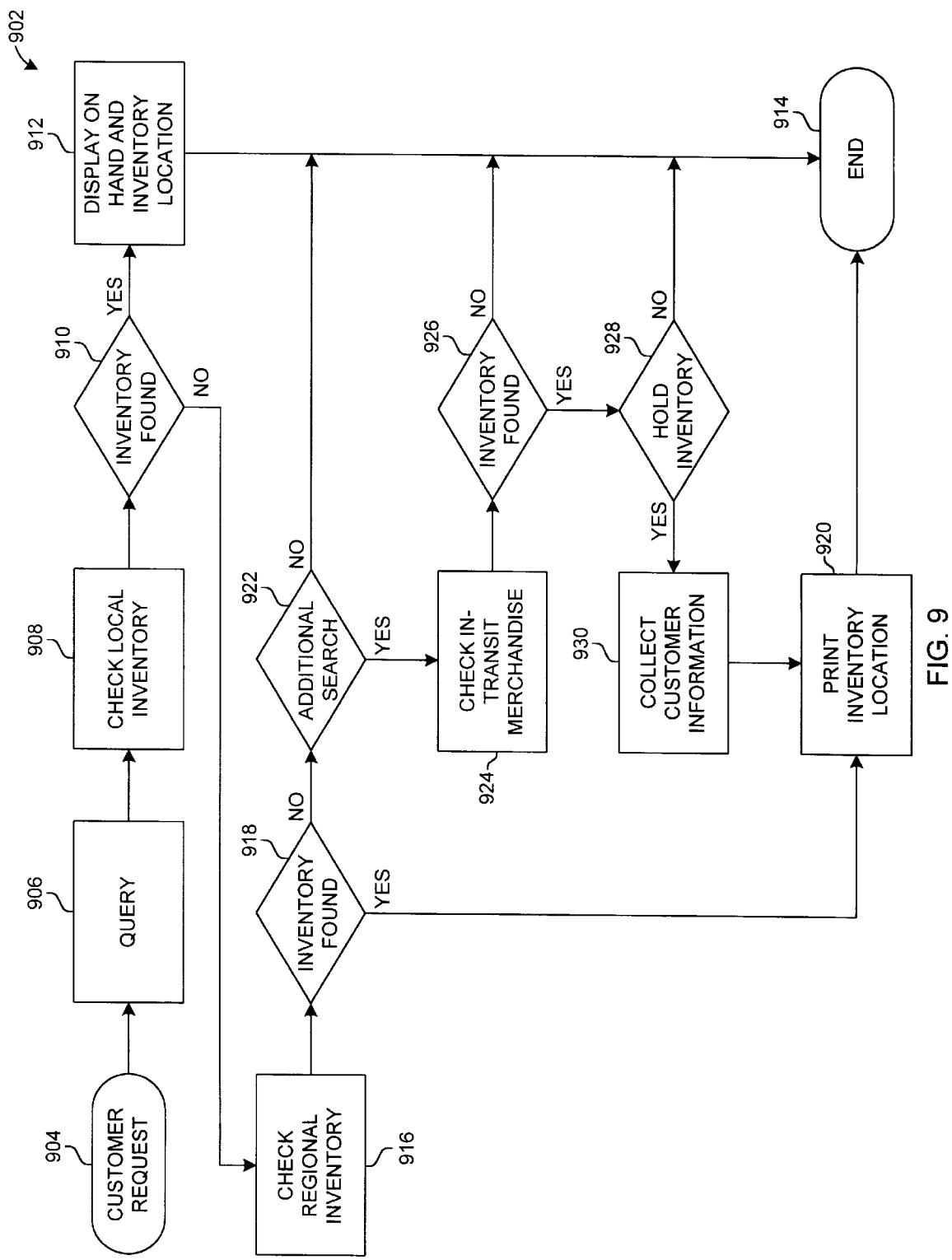
FIG. 9 is a block diagram of a lot locator application for a performance system in accordance with an embodiment of the present invention.

FIG. 9 depicts an exemplary embodiment of an application for a lot locator 902. The lot locator 902 is an application that can locate a piece of inventory based upon an identification, such as a lot number. The lot locator 902 determines the location of the inventory at a store or within a regional area or a distribution area. The lot locator 902 operates as follows.

A customer request is generated at 904. A query is using a search engine at 906. The query identifies an inventory identification, such as a lot number. The local inventory is checked at 908.

If the inventory is found at 910, information is generated to the user identifying the inventory as being on hand and identifying the location of the inventory at 912. The application then is complete at 914.

If the inventory is not found at 910, the regional inventory is checked at 916. If the inventory is found at 918, the location where the inventory was found is printed at 920. The application then is complete at 914.

If the inventory is not found at 918, it is determined if the user should do an additional search at 922. If an additional search is not to be done at 922, the application is complete at 914. If an additional search is to be completed at 922, inventory information for in-transit merchandise is checked at 924. If the inventory is not found at 926, the application is completed at 914.

If the inventory is found at 926, it is determined if the inventory should be held at 928. If the inventory is not to be held at 928, the application is completed at 914. If the inventory is to be held at 928, the customer information is collected at 930. The inventory location is printed at 920 and provided to the customer. The application then is complete at 914.

Those skilled in the art will appreciate the variations from the specific embodiments disclosed above are contemplated by the invention. The invention should not be restricted to the above embodiments, but should be measured by the following claims.

What is claimed is:

1. A system for performance support configured to be operated on at least one processor by a user comprising:

content configured as granules of information in multiple media formats;

a computer based learning module configured with performance-centered situated based instruction to generate a subset of the content having selected granules of information in at least one of the multimedia formats based upon a user selection; and a user interface configured to generate the subset of content having the selected granules of information in the multimedia format for viewing by the user.

* * * * *